United States Patent Office 3,573,908
Patented Apr. 6, 1971

3,573,908
PHOTOGRAPHIC TECHNIQUE FOR THE SELECTIVE DEPOSITION OF A CERAMIC SUBSTRATE GLAZE
Richard H. Minetti, Westfield, N.J., assignor to Bell Telephone Laboratories, Incorporated, Murray Hill, N.J.
No Drawing. Filed June 6, 1969, Ser. No. 831,250
Int. Cl. G03c 7/00
U.S. Cl. 96—34      4 Claims

ABSTRACT OF THE DISCLOSURE

A selective glaze pattern less than 13 microns in thickness is obtained by preparing a mixture of a photoresist and a multicomponent oxide glaze frit, applying the resultant mixture to an alumina substrate and exposing, developing and firing the resultant coating.

---

This invention relates to a technique for the deposition of a ceramic substrate glaze. More particularly, the present invention relates to a technique for the deposition of a glaze upon a high density alumina ceramic substrate.

In recent years, considerable interest has been generated in the electronics industry in integrated circuitry wherein thin films of various materials are deposited upon insulating substrates and subsequently fabricated into resistors, capacitors and interconnections. Studies of the electrical performance of such circuitry have focused the attention of workers in the art upon the substrate surfaces and have resulted in the imposition of stringent requirements thereon.

The material most commonly selected for this purpose during the early stages of the development of the technology was a low alkali content glass, such selection being dictated by considerations relating to surface smoothness and cost. However, the popularity of the glass substrate was short lived, for the increasing sophistication of the technology soon created a need for a substrate material manifesting thermal conductivities superior to that of glass and a material capable of withstanding the pressures normally encountered in thermocompression lead bonding. These desiderata were found to be met by high density alumina ceramics, typically coated with a ceramic glaze, the purpose of the glaze being to enhance the smoothness characteristics of the ceramic.

Heretofore, selective glazing of ceramic substrates has been accomplished by glaze spraying through suitable masks, silk screening of glaze pastes, glaze transfer techniques, selective etching and firing techniques, etc. Although each of these techniques has proven satisfactory in certain applications, there are numerous drawbacks indigenous thereto, so precluding the total exploitation of the art. The most promient difficulties encountered previously have been poor glaze pattern edge definition, nonuniformity in glaze thickness ranging from approximately 10–16 microns, etc. Thus, workers in the art have long sought to develop a simple and economically attractive selective glazing process for high density alumina ceramics which results in an ultrathin uniform glaze manifesting superior pattern edge definition.

In accordance with the present invention, these requirements are met by a novel technique involving photosensitization principles. Briefly, the inventive technique involves mixing finely ground glaze particles with a conventional photoresist, applying the resultant mixture to a substrate and then baking, exposing, developing and firing. The resultant films have been found to range in thickness from about 13 microns down to less than one micron. Additionally, line definition of the resultant glaze pattern has been found to approach that of the photographic masks employed and line widths ranging down to 0.005 inch have been attained.

A general outline of the present invention is set forth below. Certain operating parameters and types of starting materials have been indicated.

The glaze composition selected for use in the practice of the present invention is a multicomponent oxide system comprising the following components in the amounts indicated:

| | Percent by weight |
|---|---|
| $Al_2O_3$ | 4–10 |
| $SiO_2$ | 38–43 |
| $BaO$ | 5–18 |
| $PbO$ | 13–22 |
| $Bi_2O_3$ | 5–15 |
| $TiO_2$ | 0.5–2 |
| $K_2O$ | 0.5–2 |
| $As_2O_3$ | 0.25–1 | and at least one member selected from the group consisting of $B_2O_3$ and $CaO$ in amounts ranging from 0–10%, by weight. The compositions of interest are obtained by forming a mixture of the constituent components of the glaze and heating the mixture to a temperature within the range of 1350–1450° C. at which point a glass is formed. The molten glass is then poured into cold water, thereby fracturing the glass. The resultant particles are then ground to a desired particle size.

The photoresist chosen for use herein may be selected from among the widely known negative or positive photoresist solutions which typically consist of low molecular weight polymers dissolved in organic solvents containing photosensitizers. The commercially available photoresists fall into three groups on the basis of their fundamental photochemical reactions. The first group includes solutions of polyvinyl cinnamates which undergo crosslinking reactions upon exposure to ultraviolet light. The polyvinyl cinnamate structure contains two cinnamate side chains on a carbon-hydrogen backbone and the low molecular weight polymers in the photoresist typically average seven side chains per molecule. After the application of the resist, the cinnamate film is exposed to ultraviolet light and becomes insoluble in its prior solvents due to the formation of a cross-linked network. The primary advantages of polyvinyl cinnamates resides in their inert alkane backbone and in the strength of the two carbon-carbon bonds formed at each cross-link. These resists are commercially available under various names such as, "KPR," "KPR–2," "KOR," etc.

The second group of commercially available resists comprises low molecular weight aliphatic polymers which are cross-linked by the photochemical decomposition of aromatic azides. The nitrene intermediate formed by the photochemical decomposition is so reactive that it tends to couple with any neighboring molecule. Among the more popular commercially available photoresists within this category is one consisting of a xylene solution of polyisobutylene, a synthetic rubber, mixed with bifunctional aromatic azido components, such as 4,4'-diazidochalcone. During the exposure stage, this bifunctional agent serves to link two of the polyisobutylene molecules by means of coupling reactions. These resists are commercially available under various names such as "KMER," "KTFR," etc.

The third group of photoresists are referred to as positive image forming materials which comprise organic ester solutions of orthoquinone diazides plus carboxymethyl ethers of polymeric phenol formaldehydes. These compositions, soluble initially only in organic solvents, become soluble in aqueous alkaline solutions upon exposure to light. This change in solubility depends upon the photochemical decomposition of the orthoquinone diazide followed by rearrangement and a subsequent hydrolysis which results in the formation of a carboxylic acid. These resists are commercially available under names such as "AZ 1350," "AZ 340," "AZ 119," etc.

Each of these three groups of photoresist compositions normally contain photosensitizers. These are organic components which absorb radiant energy over a wide region of the spectrum and transfer the energy to the active centers in the polymers to initiate the cross-linking reaction.

The first stage in the preparative process involves ball milling the glaze frit to the required particle size. It has been found that in order to attain the desired glaze thickness, that is, less than 13 microns, it is necessary to ball mill until a particle size of the order of 4 microns is attained. Milling is effected by conventional techniques in the presence of a solvent for a time period ranging from 105 to 125 hours. Studies have revealed that failure to mill for at least 105 hours results in a composition wherein the particle size is unduly large, whereas milling beyond the noted maximum increases the statistical likelihood of adulterating the composition with particles of the grinding media. At the conclusion of the milling operation, approximately 90% of the particles range in diameter from about 0.43 to 4 microns. The resultant glaze particles do not require further milling, however, upon adding the fine frit to the photoresist employed herein, large agglomerates form and further milling is required to obtain a homogeneous mixture.

The next factor to be considered in preparing the materials for use herein is the viscosity of the photoresist solution. The spin application of conventional photoresists, which is the procedure employed, requires that the viscosity of the solution range from approximately 55–60 centipoises at 25° C. Thus, the photoresists as obtained from commercial sources must be diluted with a suitable thinner to obtain the required viscosity.

The materials so prepared are now ready for mixing and the glaze and the photoresist solution are added to a suitable mixing vessel, the ratio of glaze to photoresist varying from 0.45:1–0.75:1. Failure to employ the minimum amount of glaze prohibits the required flow during the processing, so resulting in the inability to fill the voids in the ceramic, whereas the use of ratios appreciably beyond the noted maximum results in the glaze separating from the polymerized photoresist thereby leaving holes in the final glazed surface which results in glaze thicknesses appreciably beyond the 13 micron upper limit. The mixture is then ball milled as indicated above for the purpose of breaking up agglomerates.

The present invention is primarily directed toward glazes utilized upon high density alumina substrates which, for purposes of the invention, are defined as compositions containing at least 85%, by weight, aluminum oxide.

Prior to the application of the glaze-photoresist composition, the substrate is cleansed with a lint-free cloth and subjected to air blasting for the purpose of removing loose particles from the surface. Next, the substrate is placed upon a conventional spinning fixture and the glaze-photoresist composition poured thereupon. After the initial impingement of the mixture upon the center of the substrate, the fixture is actuated and caused to rotate at a set speed ranging from 400–3000 r.p.m. It will be understood by those skilled in the art that the thickness of the glaze is a function of the spinning speed and that deviations from the stated range fail to yield the required glaze thickness.

Following, the substrate bearing the glaze composition is baked at a temperature ranging from 100–120° C. for a time period ranging from 15–30 minutes. Next, the substrate is again placed upon the spinning fixture and a coating of photoresist solution, (thickness not being critical) without glaze, is applied utilizing the previously prepared photoresist solution. The purpose of this coating is to prevent the glaze particles from separating from the polymerized areas of the coating during the subsequent ultrasonic developing stage. This coating step is again followed by baking in the manner previously described.

After cooling the substrate member and its coating, the assembly is exposed to a light source through a suitable mask for a time period ranging from 1–3 minutes, the exposure time being a function of the specific batch of photoresist.

Developing is then effected in a 2-stage process, the first stage involving a soak in a conventional photoresist developer for a time period ranging from 40–50 seconds followed by development in an ultrasonic developing bath for a time period ranging from 25–60 seconds.

The next step in the practice of the present invention involves firing the glaze. This is also accomplished in a 2-stage process, the first stage involving firing in nitrogen at temperatures ranging from 590–610° C. This step results in the conversion of the organic photoresist to carbon particles which are converted to carbon dioxide in the presence of air at temperatures ranging from 945–955° C. in the second stage of the firing cycle over a time period of from 8–14 minutes. The rate of air flow into the firing chamber is desirably maintained at a value within the range of 750–850 cubic centimeters per minute. Failure to maintain the minimum value of temperature leads to bubbling of the glaze, whereas exceeding the maximum results in increased reaction between the substrate and the glaze. The coated substrate is then removed from the firing furnace and cooled to room temperature. Studies have revealed that it is undesirable to either heat or cool in any of the preceding steps at a rate in excess of 50° C. per minute.

An example of the application of the present invention is set forth below. It is intended merely as an illustration and is to be appreciated that the process described may be varied by one skilled in the art without departing from the spirit and scope of the invention.

EXAMPLE 48 grams of a glaze comprising:

| | Percent by weight |
|---|---|
| $Al_2O_3$ | 8 |
| $SiO_2$ | 41 |
| CaO | 5 |
| BaO | 15 |
| $B_2O_3$ | 5 |
| PbO | 15 |
| $Bi_2O_3$ | 8 |
| $TiO_2$ | 1 |
| $K_2O$ | 2 |
| $As_2O_3$ | 0.5 | were added to a ball mill jar containing 40½ x ½" balls occupying 40% of the internal volume of the jar and milled for 115 hours. Then, 93 milliliters of a xylene solution of polyisobutylene mixed with 4,4' diazidochalcone and a sensitizer, manifesting a viscosity of 58 centipoises were added to the previously milled glazed composition and the mixture milled for 18 hours. Next, a 99.6%, by weight, alumina substrate was wiped with a clean lint-free cloth and subsequently air blasted. The cleansed substrate was next placed upon a spinning fixture and rotated at 1000 r.p.m. for 15 seconds, while the mixture was poured thereon. The substrate was then baked at 120° C. for 30 minutes and cooled to room temperature.

Following, the coated substrate was returned to the spinning fixture and rotated at 2000 r.p.m., while enough of a solution of photoresist and thinner manifesting a viscosity of 58 centipoises at 25° C. to cover the entire surface of the substrate was poured thereon. Spinning was continued for three seconds. Thereafter, the substrate was again baked for 30 minutes at 120° C. and cooled to room temperature. The substrate was then exposed through a glass mask for three minutes using an arc light source. The substrate was then soaked in a conventional photoresist developer, coated side down, for 45 seconds. Then, the substrate was removed and held coated side down with a tweezers in an ultrasonic bath for 15 seconds. The substrate was then removed from the bath and the procedure repeated with the tweezers held in another spot. After developing, the substrate was placed in an acetone bath for 30 seconds and dried with an air blast.

Firing of the glaze was next effected in a nitrogen ambient at 600° C. for 10 minutes. After the expiration of this time period, the nitrogen was purged from the system and air bled therein at a rate of 800 cubic centimeters per minute for 15 minutes after which the temperature was elevated to 950° C. and held thereat for 10 minutes. The furnace was then turned off and the substrate cooled to room temperature and removed. The resultant glaze was 6.5 microns in thickness.

It will be understood by those skilled in the art that variations in the described procedure may be made without departing from the spirit and scope of the invention, for example, the color density of the photoresist may be varied to obtain enhanced image definition. This process can also be used to obtain the glaze thicknesses stated herein when a pattern in the glaze is not desired, e.g., covering the entire surface of a ceramic substrate.

I claim:

1. A process for the preparation of a ceramic substrate glaze comprising the steps of (a) mixing a multicomponent oxide glaze having an average particle size of 4 microns and comprising the following components in the amounts indicated:

| | Percent by weight |
|---|---|
| $Al_2O_3$ | 4–10 |
| $SiO_2$ | 38–43 |
| BaO | 5–18 |
| PbO | 13–22 |
| $Bi_2O_3$ | 5–15 |
| $TiO_2$ | 0.5–2 |
| $K_2O$ | 0.5–2 |
| $As_2O_3$ | 0.25–1 | and at least one member selected from the group consisting of CaO and $B_2O_3$ in an amount within the range of 0–10%, by weight, with a photoresist solution evidencing a viscosity within the range of 55–60 centipoises at 25° C., the ratio of glaze to photoresist solution being within the range of 0.45:1–0.75:1, (b) depositing said mixture upon a high density alumina ceramic substrate, (c) depositing a layer of photoresist without glaze upon said coated substrate, (d) exposing said coated substrate to a light source through a suitable mask and developing the exposed coating, and (e) firing the glaze in nitrogen at temperatures ranging from 590–610° C. and then at temperatures ranging from 945–955° C. in air.

2. Process in accordance with claim 1 wherein deposition of said mixture is effected by spinning techniques at a spin rate within the range of 400–3000 r.p.m.

3. Process in accordance with claim 1 wherein said developing is effected in two stages, the first stage involving a soak in a developer for a time period ranging from 40–50 seconds and the second stage involving ultrasonic developing for a time period ranging from 25–60 seconds.

4. Process in accordance with claim 1 wherein said glaze comprises 8%, by weight, $Al_2O_3$; 41%, by weight, $SiO_2$; 5% by weight, CaO; 15%, by weight, BaO; 5%, by weight, $B_2O_3$; 15%, by weight, PbO; 8%, by weight, $Bi_2O_3$; 1%, by weight, $TiO_2$; 2%, by weight, $K_2O$; and 0.5%, by weight, $As_2O_3$.

References Cited

UNITED STATES PATENTS

| 2,732,297 | 1/1956 | Minsk et al. | 96—34 |
| 3,222,173 | 12/1965 | Belko et al. | 96—34X |
| 3,470,002 | 9/1969 | DiMarcello et al. | 106—49 |
| 3,474,718 | 10/1969 | Guthrie et al. | 96—34 |

J. TRAVIS BROWN, Primary Examiner

J. D. WINKELMAN, Assistant Examiner

U.S. Cl. X.R.

106—49